Feb. 7, 1950  H. C. BECK  2,496,327
LAWN EDGER
Filed Aug. 28, 1946
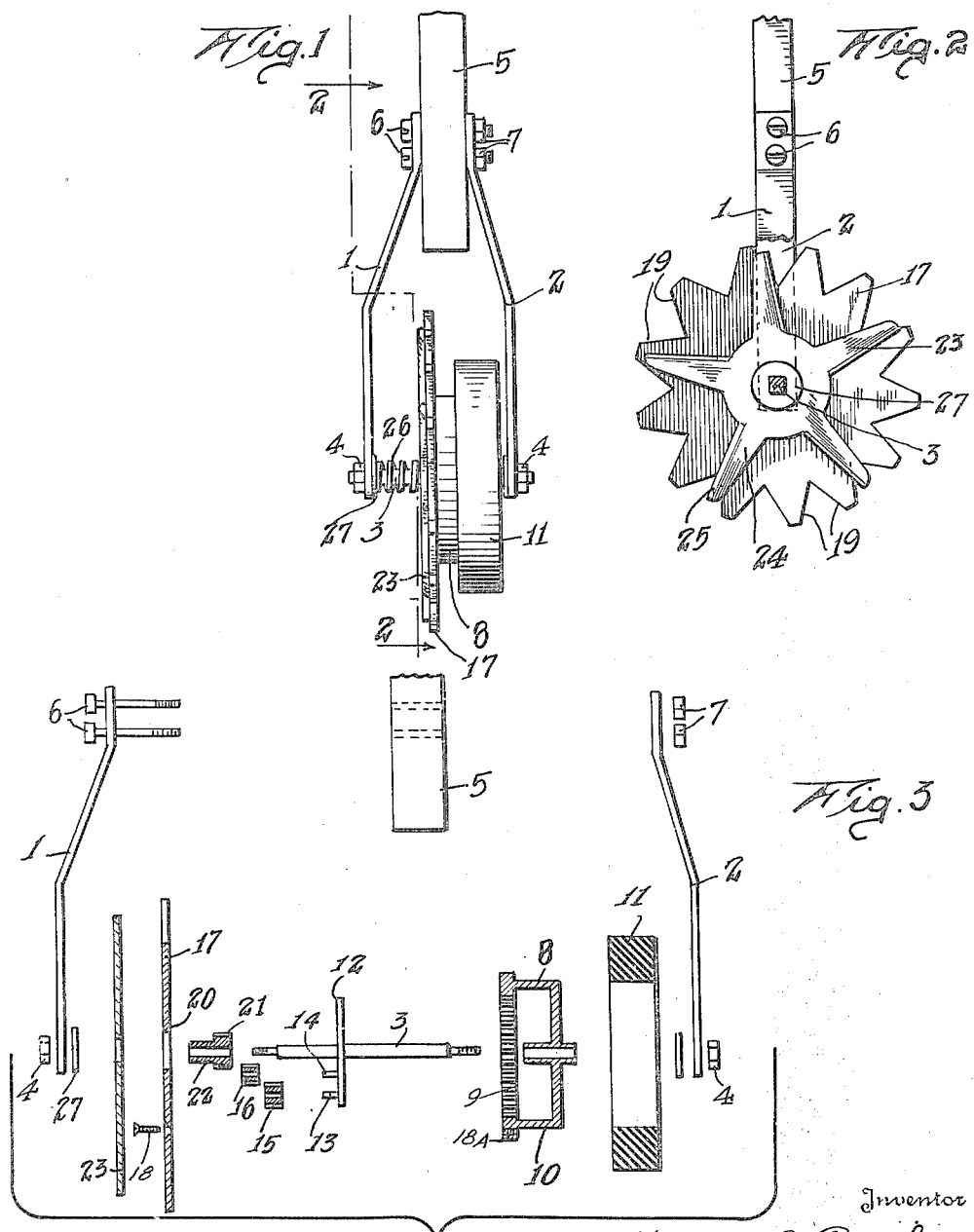
Inventor
Horace C. Beck
By Lyon & Lyon
Attorneys Patented Feb. 7, 1950

2,496,327

UNITED STATES PATENT OFFICE 2,496,327

LAWN EDGER

Horace C. Beck, Los Angeles, Calif.

Application August 28, 1946, Serial No. 693,541

1 Claim. (Cl. 56—256)

My invention relates to a lawn edger and more specifically to a tool for trimming the edges of a lawn.

Most lawn edgers comprise a large cutting disk driven by a wheel rolling on the surface of the lawn, or the cutting disk is free to rotate without being driven. My lawn edger has a pair of cutting instruments positively driven by the lawn engaging wheel, but the blades turn at different speeds of rotation and act as shears to more positively cut the lawn rather than by the usual crushing method of other edgers.

Other objects and advantages of my invention will be apparent from the following description of the preferred embodiments thereof.

In the drawings:

Figure 1 is a front elevation of my lawn edger.

Figure 2 is a cross section taken on the line 2—2 of Figure 1.

Figure 3 is an exploded front elevation.

An edger constructed in accordance with my invention comprises a pair of strap arms 1 and 2 which have holes in their lower extremities in which is positioned a shaft 3. The shaft 3 is held in position by the nuts 4. At the other end of the strap arms 1 and 2 is attached a handle 5 by means of the nuts and bolts 6 and 7.

Rotatively positioned upon the shaft 3 is a gear 8 with teeth 9. On the surface 10 is positioned a tire 11 formed of rubber or other desirable material. A plate 12 is rotatively positioned upon the shaft 3 and carries the stub shafts 13 and 14, which have the pinion gears 15 and 16 rotatively mounted thereon. The pinion gears 15 and 16 are in mesh with each other and the teeth of the pinion gear 15 mesh with the teeth 9 of the gear 8.

A rotary cutter 17 is mounted on the gear 8 by the pins 18 threaded into the holes 18A, thus rotation of the gear 8 by friction of the tire 11 against the ground causes the cutter 17 to revolve in the same direction and at the same speed. The cutter 17 is preferably formed with a serrated edge to form a series of cutting edges 19 in the form of a toothed cutter.

A circular hole 20 in the center of the cutter 17 permits the crown gear 21, rotatively carried on the shaft 3, to extend therethrough. The gear 21 is in mesh with the gear 16.

As is shown in Figure 2, the ends of the shaft 3 are squared where they pass through the holes in the strap arms 1 and 2.

A squared boss 22 upon the gear 21 extends outwardly from the cutter 17 and upon this squared boss 22 is mounted the cutting blade 23. The cutting blade 23 is formed to have sharpened arms 24 which form knife edges 25. A spring 26, positioned adjacent the cutter 23, exerting its pressure upon a washer 27 and then upon the strap arm 1, causes the two cutter blades 17 and 23 to be yieldably held in contact.

When my lawn edger is run upon its tire 11 it causes the gear 8 to rotate. The gears 15, 16 and 21 increase the speed of rotation of the cutter 23 to a substantially 4 to 1 speed in relation to the speed of the cutter 17. Thus, any grass caught between the cutting edges 25 and 19 on their respective cutters 17 and 23, will cause these cutting edges to act as a pair of scissors and the grass will be readily cut.

While I have described the preferred embodiments of my invention, I am not limited to any of the details herein set forth except in the following claim.

I claim:

In a lawn edger, a frame supporting a non-rotating shaft, a ring gear rotatably carried by said shaft and having friction means attached to its perimeter adapted to engage the ground and to rotate said ring gear, a shearing cutter attached to said ring gear and adapted to rotate therewith, a plate rotatively mounted upon said shaft and having a pair of stub shafts attached thereto, meshing pinion gears upon said stub shafts, one of said pinion gears meshing with said ring gear and the other pinion gear meshing with a crown gear rotatively mounted upon said shaft, said crown gear having a cutter attached thereto adapted to rotate upon said shaft, and means to force said cutter and said shearing cutter into a contacting position to produce a shearing movement.

HORACE C. BECK.

REFERENCES CITED

The following references are of record in the file of this patent:

UNITED STATES PATENTS

| Number | Name | Date |
|---|---|---|
| 1,883,817 | Olsen et al. | Oct. 18, 1932 |
| 1,991,305 | Willits | Feb. 12, 1935 |

FOREIGN PATENTS

| Number | Country | Date |
|---|---|---|
| 15,379 | Great Britain | July 20, 1908 |